US008537744B2

(12) United States Patent
Chou

(10) Patent No.: US 8,537,744 B2
(45) Date of Patent: Sep. 17, 2013

(54) METHOD OF DISCOVERING AN AD-HOC ON-DEMAND DISTANCE VECTOR ROUTE HAVING AT LEAST A MINIMUM SET OF AVAILABLE RESOURCES IN A DISTRIBUTED WIRELESS COMMUNICATIONS NETWORK

(75) Inventor: Chun-Ting Chou, Briarcliff Manor, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1066 days.

(21) Appl. No.: 12/298,809

(22) PCT Filed: Apr. 30, 2007

(86) PCT No.: PCT/IB2007/051602
§ 371 (c)(1),
(2), (4) Date: Oct. 28, 2008

(87) PCT Pub. No.: WO2007/125514
PCT Pub. Date: Nov. 8, 2007

(65) Prior Publication Data
US 2009/0073924 A1 Mar. 19, 2009

Related U.S. Application Data

(60) Provisional application No. 60/796,984, filed on May 1, 2006.

(51) Int. Cl.
*H04W 40/02* (2009.01)
(52) U.S. Cl.
USPC .......................................................... 370/328
(58) Field of Classification Search
USPC .................. 370/229, 235, 238, 310, 328, 351; 455/7
See application file for complete search history.

(56) References Cited

U.S. PATENT DOCUMENTS 5,233,604 A * 8/1993 Ahmadi et al. ............... 370/238
5,515,379 A 5/1996 Crisler
(Continued)

FOREIGN PATENT DOCUMENTS

EP 1467524 A1 10/2004
WO WO2004014091 A1 2/2004

OTHER PUBLICATIONS

C.E. Perkins et la., "Ad-Hoc On-Demand Distance Vector Routing" Proceedings WMCSA, Feb. 1999, pp. 90-100, XP002173721.
(Continued)

*Primary Examiner* — Chi Pham
*Assistant Examiner* — Robert Lopata
(74) *Attorney, Agent, or Firm* — Larry Liberchuk

(57) ABSTRACT

In a wireless communication network (300) comprising a plurality of devices (100), a method of discovering a route for transmitting data from a source device (110A) to a destination device (110D) via multi-hop relay, includes broadcasting from the source device (110A) a route discovery request for transmitting data to the destination device (HOD). The route discovery request includes: a first field indicating a hop-count limit, a second field indicating a number of slots, X, required for transmitting the data, a third field indicating an ID for the source device (110A), and a fourth field indicating an ID for the destination device (HOD). The source device (110A) then receives a route discovery response indicating a route from the source device (110A) to the destination device (HOD). The route discovery response includes a first field indicating a number of hops between the source device (110A) and the destination device (HOD).

19 Claims, 4 Drawing Sheets

(56) References Cited

U.S. PATENT DOCUMENTS

| | | | |
|---|---|---|---|
| 5,987,011 A * | 11/1999 | Toh | 370/331 |
| 6,954,435 B2 * | 10/2005 | Billhartz et al. | 370/252 |
| 7,177,295 B1 * | 2/2007 | Sholander et al. | 370/338 |
| 7,330,694 B2 * | 2/2008 | Lee et al. | 455/7 |
| 7,515,544 B2 * | 4/2009 | Nambisan et al. | 370/238 |
| 7,564,842 B2 * | 7/2009 | Callaway et al. | 370/389 |
| 7,693,060 B2 * | 4/2010 | Polk et al. | 370/231 |
| 7,706,282 B2 * | 4/2010 | Huang | 370/238 |
| 7,719,972 B2 * | 5/2010 | Yuan et al. | 370/230 |
| 7,787,361 B2 * | 8/2010 | Rahman et al. | 370/217 |
| 7,961,710 B2 * | 6/2011 | Lee et al. | 370/351 |
| 8,064,416 B2 * | 11/2011 | Liu | 370/338 |
| 2005/0185588 A1 * | 8/2005 | Park et al. | 370/238 |
| 2006/0007882 A1 * | 1/2006 | Zeng et al. | 370/328 |
| 2007/0195713 A1 * | 8/2007 | Khan et al. | 370/254 |

OTHER PUBLICATIONS

Chunghung R. Lin et al., "QoS Routing in Ad Hoc Wireless Networks", IEEE Journal on Selected Areas in Communications, IEEE Service Center, Piscataway, NJ, vol. 17, No. 8, Aug. 1999, XP011055000.

Chin-Ting Chou et al., "Mobility Support Enhancements for the WiMedia UWB MAC Protocol", Broadband Networks, 2005 2nd International Conference on Boston, MA Oct. 2005, pp. 213-219, XP010890344.

* cited by examiner

METHOD OF DISCOVERING AN AD-HOC ON-DEMAND DISTANCE VECTOR ROUTE HAVING AT LEAST A MINIMUM SET OF AVAILABLE RESOURCES IN A DISTRIBUTED WIRELESS COMMUNICATIONS NETWORK

This invention pertains to the field of wireless communication networks, and more particularly to a method for discovering a route for multi-hop transmission between a source device and a destination device in a distributed access wireless communications network that has at least a minimum set of available resources (e.g., slots).

There continues to be a proliferation of wireless communications networks. For example, the FCC has proposed to allow unlicensed radio transmitters to operate within the broadcast television spectrum at locations where one or more of the allocated terrestrial television channels are not being used, so long as such unlicensed transmitters include safeguards that insure no interference with the reception of licensed terrestrial television signals. Various organizations developed ultrawideband (UWB) wireless communication technologies to take advantage of permitted unlicensed wireless device operations in licensed frequency bands.

In particular, the WIMEDIA® Alliance has developed specifications for wireless networks based upon UWB technology. For example, the WIMEDIA® MAC specification provides a fully distributed medium access control (MAC) protocol to support high-speed single-hop transmission between devices that are located in the vicinity of each other, e.g., so-called personal area networks (PANs). Meanwhile, in December 2005, the European Computer Manufacturer's Association (ECMA) published ECMA-368: "High Rate Ultra Wideband PHY and MAC Standard" specifying an ultra wideband physical layer (PHY) and distributed MAC sublayer for a high-speed, short range, distributed access wireless network that may include portable and fixed devices.

As used herein, a device in a wireless network may also be referred to as a terminal or a node. Also as used herein, a wireless network is said to have "distributed access" when there is no central controller, base station, master station, etc. that governs or controls access to the communication resources (e.g., time slots in a time division multiple access (TDMA) protocol) of the wireless network by the other devices in the network.

However, due to the regulatory restriction on transmission power, the transmission range of devices using the current WIMEDIA® MAC is limited, and decreases with any increase of the physical transmission rate. Accordingly, due to transmission range limitations, in some cases it is not possible for one device in a wireless personal area network (PAN) to transmit data to another device in the same network if the two devices are physically separated by too great of a distance. In other cases, where the two devices may be closer together, transmission may be possible, but only at reduced data rates. However, there are a number of applications where it would be highly desirable for devices that are remotely located from each other by a significant distance to be able to send and receive data to and from each other at higher data rates than are supported by the transmission power limitations on the devices.

Accordingly, it would be desirable to provide a method of discovering a route for multi-hop route data transmission from a source device to a destination device in a distributed wireless network even if the two devices are physically separated by too great of a distance for direct wireless transmission. It would also be desirable to provide such a method that supports high data transmission rates and spectrum efficiency.

In one aspect of the invention, in a wireless communication network comprising a plurality of devices a method of discovering a route for transmitting data from a source device to a destination device via multi-hop relay is provided. The method includes broadcasting from the source device a route discovery request for transmitting data to the destination device. The route discovery request includes at least a first field indicating a hop-count limit, a second field indicating a number of slots, X, required for transmitting the data, a third field indicating an ID for the source device, and a fourth field indicating an ID for the destination device. The method also includes receiving at the source device a route discovery response indicating a route from the source device to the destination device. The route discovery response includes at least a first field indicating a number of hops between the source device and the destination device.

In another aspect of the invention, in a wireless communication network comprising a plurality of devices, a method of discovering a route for transmitting data from a source device to a destination device via multi-hop relay is provided. The method includes receiving at an Nth device a route discovery request for transmitting data from the source device to the destination device. The route discovery request includes at least: a first field indicating a hop-count limit, a second field indicating a number of slots, X, required for transmitting the data, a third field indicating a number of hops between the source device and the Nth device, a fourth field including a request ID uniquely identifying the route discovery request, a fifth field indicating an ID for the source device, and a sixth field indicating an ID for the destination device. The method further includes updating a route information table at the Nth device to set a hop count value to reach the source device from the Nth device to be equal to the number of hops between the source device and the Nth device that was received in the route discovery request, and to set an ID for a next device to reach the source device from the Nth device to match an ID for an (N−1)th device from which the Nth device received the route discovery request, and determining whether the Nth device has at least 2X slots available. When the Nth device has at least 2X slots available, the method includes incrementing the number of hops in the fourth field of the route discovery request by one to update the route discovery request, and broadcasting the updated route discovery request from the Nth device. When the Nth device does not have at least 2X slots available, then the route discovery request is discarded.

In a further aspect of the invention, in a wireless communication network comprising a plurality of devices, a method of discovering a route for transmitting data from a source device to a destination device via multi-hop relay is provided. The method includes receiving at the destination device a route discovery request for transmitting data from the source device to the destination device. The route discovery request includes at least a first field indicating a hop-count limit, a second field indicating a number of slots, X, required for transmitting the data, a third field indicating a number of hops from the source device to the destination device, a fourth field including a request ID uniquely identifying the route discovery request, a fifth field indicating the source device, and a sixth field indicating the destination device. The method further includes updating a route information table at the destination device to set a hop count value to reach the source device from the destination device to be equal to the number of hops from the source device to the destination device that was received in the route discovery request, and to set an ID for a next device to reach the source device from the destination device to match an ID for an Mth device from which the destination device received the route discovery request, and determining whether the destination device has at least X slots available. When the destination device has at least X slots available, the method includes forwarding a route discovery response from the destination device to the Mth device from which the destination device received the route discovery request, the route discovery response including at least: a first field including the request ID uniquely identifying the route discovery request, a second field indicating the source device, a third field indicating the destination device, and a hop count field having an initialized hop count. When the destination device does not have at least X slots available, the route discovery request is discarded.

FIG. 1 graphically illustrates a wireless communication network;

While various principles and features of the methods and systems described below can be applied to a variety of communication systems, for illustration purposes the exemplary embodiments below will be described in the context of unlicensed wireless communication networks operating with reservation-based (e.g., TDMA) distributed access protocols.

More particularly, the exemplary embodiments described below pertain to a WIMEDIA® personal area network. However, the methods and techniques described below could also be applied in the case of other distributed access networks using reservation-based protocols, and even through a wired backbone. Of course, the scope of the invention is defined by the claims appended hereto, and is not limited by the particular embodiments described below.

Furthermore, in the description to follow various transmissions including reservation requests and reservation responses are mentioned. In the embodiments described below these requests and responses may be information elements (IEs) included in frames (packets) transmitted by a device within a media access slot (MAS). Moreover, these requests and responses are described having various fields, such as a first field, a second field, a third field, etc. In those descriptions, it should be understood that the numerical references "first," "second," etc. serve simply as nomenclature to distinguish and identify the fields and do not refer to any logical or chronological ordering or other arrangement of the fields within the IEs or frames.

With this in mind, we now describe methods by which a source device that is remotely located from a destination device in a distributed access wireless personal area network (PAN) is able to discover a relay route through various intermediate devices of the network to transmit data to the destination device at a desired data transmission rate (bandwidth).

As described below, in order to increase the transmission range while still maintaining spectrum efficiency (i.e., using a higher transmission rate), a mesh-enabled WIMEDIA® personal area network (PAN) is provided. The a mesh-enabled WIMEDIA® personal area network (PAN) is essentially a multi-hop, distributed PAN with some devices that relay/forward frames (packets) of data for their neighbors.

Figure 1:
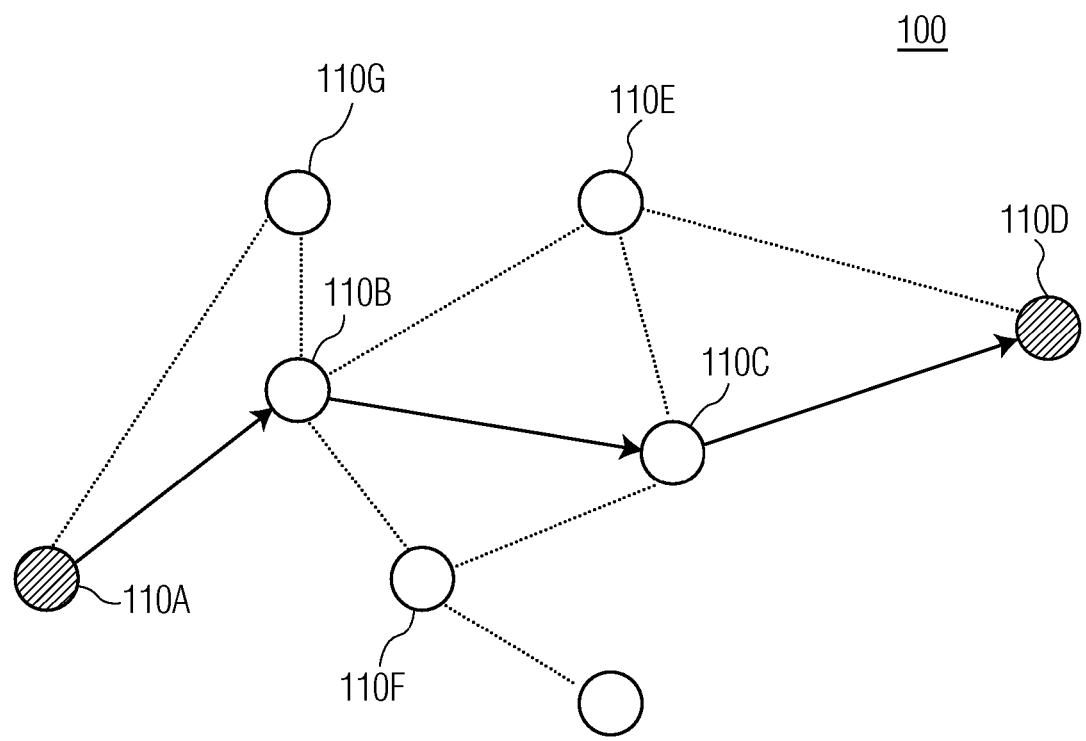

For example, FIG. 1 graphically illustrates a wireless communication network 100 including a plurality of devices 110. In this case, mesh-enable devices 110B and 110C may relay a frame originated from source device 110A to its destination device 110D, which is unreachable by device 110A via a single-hop transmission.

Two important mechanisms, namely route/path discovery and multi-hop medium time reservation, are needed to implement a mesh PAN. Multi-hop medium time reservation is not the subject the scope of this disclosure, and throughout the description to follow it is assumed that a mechanism is provided to make such resource reservations once an optimal route based on the source device's desired metrics is determined.

Thus the description to follow focuses on route/path discovery through a distributed access wireless communication network.

Figure 2A:
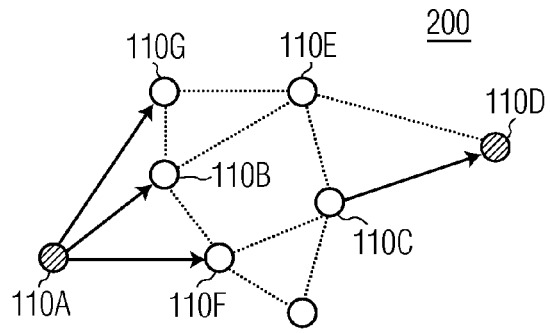
FIGS. 2a-2d illustrate a route discovery method in a distributed access wireless communication network using an ad-hoc, on-demand distance vector protocol.
Figure 2B:
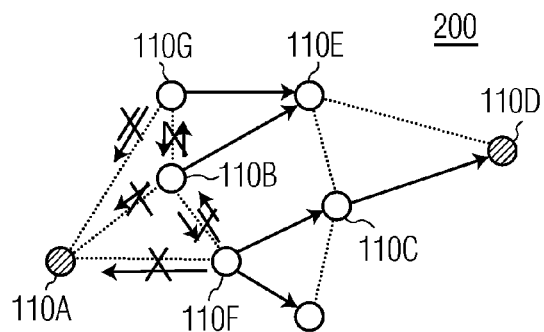
Figure 2C:
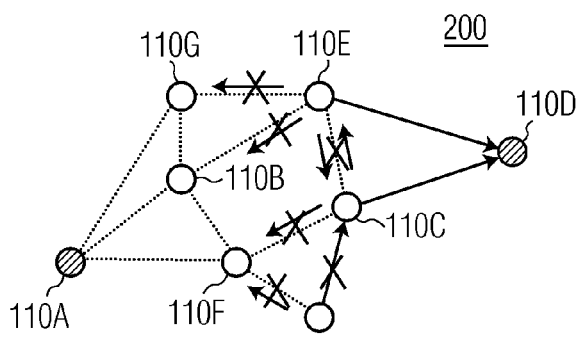
Figure 2D:
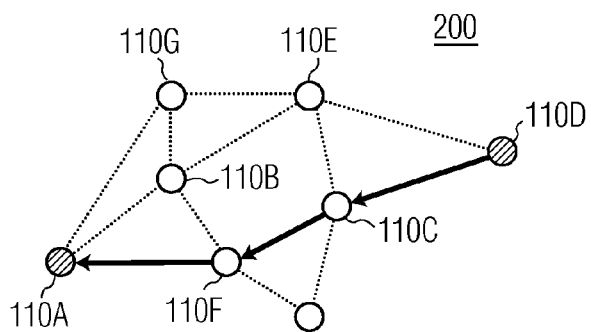

FIGS. 2a-2d illustrate a method of route discovery in a distributed access wireless communication network 200 using an ad-hoc, on-demand distance vector (AODV) protocol. In FIG. 2a source device 110A broadcasts a route discovery request (RREQ) to locate a multi-hop route to reach destination device 110D. The RREQ from source device 110A is received by a first set of three intermediate devices including intermediate devices 110B, 110G, and 110F. In FIG. 2b, each of the intermediate devices in the first group which received the original RREQ from source device 110A in turn rebroadcasts the RREQ, thus forwarding the RREQ to a second set of three additional intermediate devices, including intermediate devices 110E and 110C. At this time, the source device 110A and some or all of the first set of intermediate devices also receive the rebroadcast RREQ from the other members of the first set of intermediate devices, but they ignore (discard) the rebroadcast RREQ as a "repeat." In FIG. 2c, each of the intermediate devices in the second group which received the original RREQ from the first set of intermediate devices in turn rebroadcasts the RREQ, thus forwarding the RREQ to destination device 110D. At this time, some or all of the first and second sets of intermediate devices also receive the rebroadcast RREQ from the other members of the second set of intermediate devices, but they ignore (discard) the rebroadcast RREQ as a "repeat." Finally, in FIG. 2d, destination device 110D responds to the RREQ with a route discovery response (RREP) which is transmitted to intermediate device 110C, and forwarded by intermediate device 110C though intermediate device 110F back to source device 110A. So the path discovered in FIG. 3a-3d is 110A-110F-110E-110D The operations of the AODV routing protocol of FIGS. 2a-2d vary with the role that a device 110 plays. These operations, depending on whether device 110 is (1) a source device 110A that initiates a route discovery, (2) an intermediate device (e.g., 110B; 110C) that forwards routing messages, or (3) a destination device 110D that replies the route discovery request, are summarized respectively below.

Each device 110 in network 200 maintains a Route Information Table with its most recent information concerning the IDs of the other devices 110 in communication network 200, the hop count (number of hops required) to reach or send data to each of these other devices 110, and the "next device" to which the data should be sent in order to reach each of the other devices 110 in communication network 200. Whenever the route to a destination device (e.g., destination device 110D) is unavailable in the Route Information Table of source device 110A, then source device 110A broadcasts a route discovery request (RREQ). A RREQ may be instantiated as an IE having a plurality of fields. Beneficially, a RREQ includes at least a first field indicating a hop-count limit, a second field indicating a number of hops between the source device and the current device, a third field including a request ID uniquely identifying the route discovery request, a fourth field indicating an ID for the source device, and a fifth field indicating an ID for the destination device. Other fields may be included, and one or more of these fields may be omitted if circumstances permit. The RREQ is broadcast by source device 110A to all of it neighboring devices. Source device 110A sets the hop-count limit in the RREQ frame (Packet) to define the "searching area" which defines how far the RREQ is forwarded. Source device 110A may re-send the RREQ if a route discovery response (RREP) is not received within a certain period of time. It may do so, along with other control algorithms, when the traffic due to re-transmission of RREQ is controlled.

Meanwhile, intermediate devices (e.g., devices 110C and 110D) receive RREQ and RREP routing messages. Beneficially, route discovery requests received and sent at all devices 110 in network 100 should all have the same number of fields, but different devices 110 may update different fields in the request, depending on its particular role in route discovery. In general, there may be M intermediate devices in a multi-hop relay route between source device 110A and destination device 110D. The behavior of the intermediate devices depends on which routing message (i.e., RREQ or RREP) is received.

When an intermediate device 110 (e.g., an Nth intermediate device, where 1≦N≦M) receives a RREQ from source device 110A or another intermediate device (e.g., an (N−1)th intermediate device), if it already has route information for the destination device 110D specified in the RREQ then it may reply with a RREP including an appropriate hop-count value, on behalf of the destination device 110D. Otherwise, then intermediate device 110 must broadcast the received RREQ with an incremented hop-count value. Intermediate device 110 should only rebroadcast the received RREQ when it receives the RREQ—identified by the source device ID and the request ID—for the first time. Beneficially, intermediate device 110 also updates the (reverse-link) routing information in its Route Information Table for source device 110A and the device 110 from which the RREQ was received.

Meanwhile, intermediate device 110 (e.g., an Nth intermediate device, where 1≦N≦M) may also receive a RREP (e.g., from an (N+1)th intermediate device, where 1≦N≦M). A RREP may be instantiated as an IE having a plurality of fields. Beneficially, a RREP includes a first field indicating a number of hops between the destination device and the intermediate device, a second field including a request ID uniquely identifying the route discovery request to which this response pertains, a third field indicating an ID for the source device, and a fourth field indicating an ID for the destination device. When intermediate device 110 receives a RREP with newer information, either a new route indicated by a larger Request ID, or a route with a smaller hop-count value, then intermediate device 110 should: (1) update local routing information (i.e., reverse link to destination device 110D) in its Route Information Table; and (2) increment the hop-count value in the received RREP; and (3) forward it back to source device 110A using its local routing information obtained from the previously received RREQ message from source device 110A.

Also, when destination device 110D receives a RREQ, it should: (1) update local routing information (i.e., reverse link to source device 110A) in its Route Information Table; and (2) reply with a RREP via unicast to the device from which it received the RREQ. The RREP should include an initialized hop-count value (e.g., set to zero or set to one), and either an incremented or unchanged request ID, depending on whether or nor a new route is being offered via the response.

Although the method described above can permit route discovery by source device 110A of a multi-hop relay route with a minimum hop count, it does not ensure that the selected route (or any other route) has sufficient resources to support the desired data transmission rate or bandwidth. That is, the method described above with respect to FIGS. 2a-2d does not insure that there are sufficient available (unreserved) media access slots available at each device throughout the multi-hop relay route for data transmission from source device 110A to destination device 110D at a desired data rate.

FIGS. 3a-3e illustrate another route discovery method in a distributed access wireless communication network 300 using an ad-hoc, on-demand distance vector protocol. The method described below with respect to FIGS. 3a-3e provides the ability to "weed out" routes from source device 110A to destination device 110D that are incapable of supporting a desired data transmission rate or bandwidth. In other words, the method illustrated in FIGS. 3a-3e insures that each device 110 in a selected multi-hop relay route for data transmission from source device 110A to destination device 110D has sufficient available media access slots (MAS) to forward the transmission data that the desired data rate.

As in the case of the embodiment of FIGS. 2a-2d, the operations of the enhanced AODV routing protocol of FIGS. 3a-3e vary with the role that a device 110 plays. These operations depend on whether the device is (1) a source device that initiates a route discovery, (2) an intermediate device that forwards routing messages, or (3) a destination device that replies the route discovery request. In the network 300, the devices 110 perform various operations as described above in network 200 (which will not be repeated here, for the sake of brevity), as well as additional operations described below.

Figure 3A:
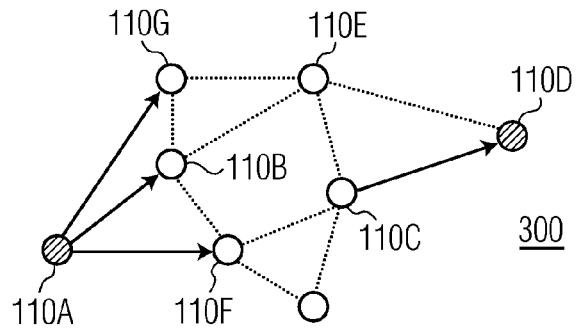
FIGS. 3a-3e illustrate another route discovery method in a distributed access wireless communication network using an ad-hoc, on-demand distance vector protocol that seeks out routes having at least a minimum set of available resources (e.g., slots).
Figure 3B:
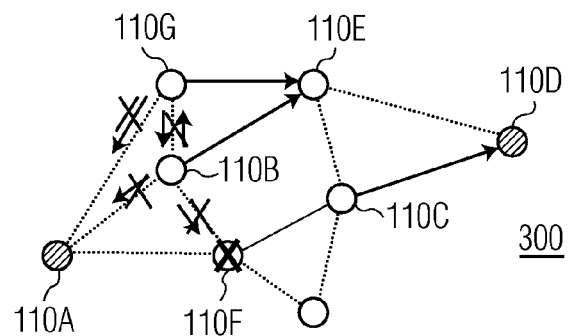
Figure 3C:
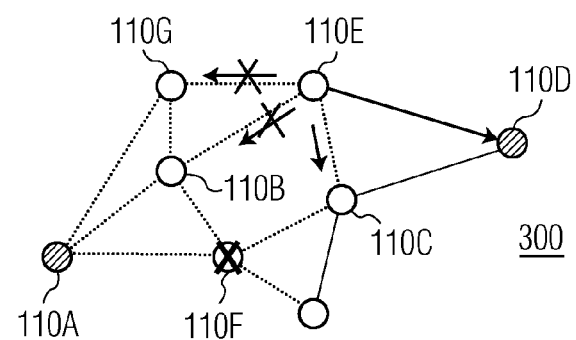
Figure 3D:
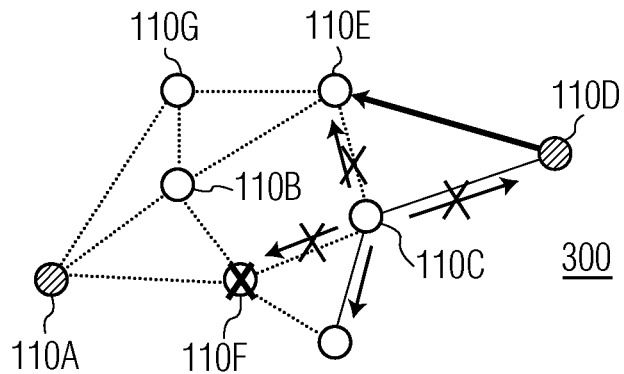
Figure 3E:
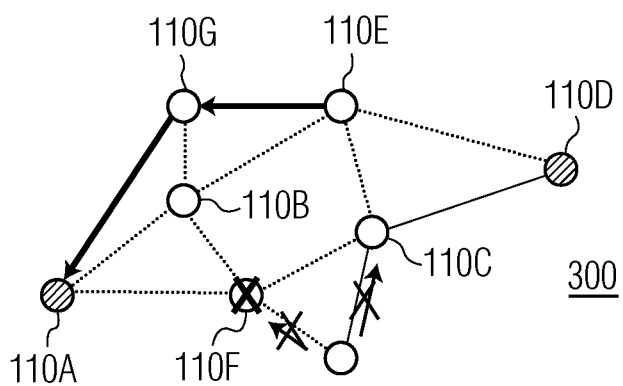

In FIG. 3a source device 110A broadcasts a route discovery request (RREQ) to locate a multi-hop route to reach destination device 110D. The RREQ from source device 110A is received by a first group of three intermediate devices including intermediate device 110B. As will be explained in detail below, the RREQ specifies a minimum number of slots (MAS) that are required for a data transmission from source device 110A to destination device 110D. The step shown in FIG. 3b proceeds the same as FIG. 2b as described above, except that intermediate device 110F does NOT forward the RREQ it received from source device 110A, because intermediate device 110F does not have a sufficient number of available slots (MAS) to support the desired data transmission. Since intermediate terminal 110F discards the RREQ, it is not forwarded to intermediate terminal 110C in FIG. 3b. The step shown in FIG. 3c proceeds the same as FIG. 2c as described above, except that there is now only one intermediate terminal (110E) in the second "set" and there is now a third "set" of intermediate devices that consists only of intermediate device 110E. In FIG. 3d, destination device 110D responds by transmitting a RREP to intermediate device 110E, while intermediate device 110C rebroadcasts the RREQ which is received by destination device 110D, and intermediate device 110F. Both destination device 110D, and intermediate device 110F discard the RREQ since they have received the same request before. Finally, in FIG. 3e, the RREP is transmitted from intermediate terminal 110E, through intermediate terminal 110G, and is received by source terminal 110A. So the path discovered in FIG. 3a-3d is 110A-110G-110E-110D, which is different than the route discovered in FIGS. 2a-2d, BUT which is assured to have sufficient resources (slots) to support the desired data transmission rate or bandwidth. The reason the route is different is because device 110F which forms part of the route in FIGS. 2a-2d did not have enough slots to support the desired transmission rate, and so it was bypassed in FIGS. 3a-3e.

Compared to the operation of the communication network 200 described above, source device 110A in communication network 300 includes at least one additional field in the RREQ message when it is broadcast. The additional field identifies a number of medium access slots (MAS), X, that are needed for transmission of data at the desired data rate, or bandwidth, from source device 110A to destination device 110D. This field will be used, as explained in detail below, to insure that only those routes having sufficient bandwidth (number of available slots) at each device 110 in the route, are selected for data transmission.

Beneficially, the RREQ message of source device 110A in communication network 300 further includes: (1) a second additional field identifying an additional parameter, called "Residual Medium Time;" and (2) a bandwidth priority (B) flag. The residual medium time indicates a residual number of slots available at a device 110 in the current route from source device 110A to the present device 110 that has a fewest residual number of slots available. That is, this field identifies the residual medium time available at the "chokepoint" in the present multi-hop relay route from the source terminal to the current device. As will be explained in more detail below, as the RREQ message is forwarded from device 110 to device 110, the residual medium time is updated as necessary. However, when the RREQ is initially broadcast by source device 110A, the medium time is initialized to reflect an initial medium time value. In one embodiment, the medium time may be reset to infinity. In another embodiment, the residual medium time may be set to a maximum value available using the number of bits assigned for the field. Furthermore, the B flag may be set (e.g., to "1") to indicate that a route having a greater residual medium time should be selected or preferred over a route having a lesser residual medium time, even if the route having the lesser residual medium time has a smaller hop-count value. Furthermore, when the RREQ includes the field indicating the residual medium time, then the RREP should also include a field indicating the residual medium time and a B flag.

Meanwhile, when an intermediate device 110 of communication network 300 receives an RREQ indicating that X MAS (slots) are required for transmitting the data, then intermediate device 110 only forwards the RREQ (via broadcast) when intermediate device 110 has at least 2X MAS (slots) available to itself. Otherwise, intermediate device 110 will silently discard the received RREQ.

Also, when intermediate device 110 of communication network 300 receives a RREP that includes the B flag and the field indicating a residual medium time available at a device 110 in the route that has a fewest residual number of slots available, then intermediate device 110 should operate as follows. When the B flag is set, indicating that priority should be given to routes which have a greater number of available slots, then intermediate device 110 should update the corresponding route entry in its Route Information Table when the RREP has the same request ID as a previously received RREP, but indicates a larger residual medium time than was indicated in the previous RREP.

Furthermore, when an intermediate device 110 of communication network 300 receives a RREQ, if the amount of available MAS for the intermediate device 110, Y, is less than the residual medium time indicated in the received RREQ, then intermediate device 110 also copies the Y value into the residual medium time field of the RREQ before forwarding it.

When destination device 110D of communication network 300 receives an RREQ having a new request ID and indicating that X MAS (slots) are required for transmitting the data, destination device 110D only replies with a RREP when it has at least X MAS available for receiving data relayed from source device 110A. Otherwise, if destination device 110D of communication network 300 does not have at least X MAS available, then it discards the RREQ without responding.

Also, when destination device 110D of communication network 300 receives a RREQ that includes the B flag and the field indicating a residual medium time available at a device 110 in the route that has a fewest residual number of slots available, then destination device 110D should operate as follows. When the B flag is set, indicating that priority should be given to routes which have a greater number of available slots, then destination device 110D should update the corresponding route entry in its Route Information Table when the RREQ has the same request ID as a previously received RREQ, but indicates a larger residual medium time than was indicated in the previous RREP.

Among the benefits of using the enhanced method described above with respect to FIGS. 3a-3e are the discovery of a route with the minimal hop-count and sufficient medium access slot time available at all devices along the route, automatic load balancing throughout the communication network, and providing the flexibility to select a route with the maximum residual available slots to provide margin for resources that may be consumed between route discovery and medium time reservation.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. In a wireless communication network comprising a plurality of devices, a method of discovering a route for transmitting data from a source device to a destination device via multi-hop relay, the method comprising:

broadcasting from the source device a route discovery request for transmitting data to the destination device, the route discovery request including at least: a first field indicating a hop-count limit, a second field indicating a number of slots, X, required for transmitting the data, a third field indicating an ID for the source device, and a fourth field indicating an ID for the destination device; and receiving at the source device a route discovery response indicating a route from the source device to the destination device, the route discovery response including at least a first field indicating a number of hops between the source device and the destination device.

2. The method of claim 1, further comprising:

updating a route information table at the source device to set a hop count value to reach the destination device to be equal to the number of hops between the source device and the destination device that was indicated by the route discovery response, and to set an ID for a next device to reach the destination device from the source device to match an ID for a device from which the source device received the route discovery response.

3. In a wireless communication network comprising a plurality of devices, a method of discovering a route for transmitting data from a source device to a destination device via multi-hop relay, the method comprising:

broadcasting from the source device a route discovery request for transmitting data to the destination device, the route discovery request including at least: a first field indicating a hop-count limit, a second field indicating a number of slots, X, required for transmitting the data, a third field indicating an ID for the source device, and a fourth field indicating an ID for the destination device;

receiving at the source device a route discovery response indicating a route from the source device to the destination device, the route discovery response including at least a first field indicating a number of hops between the source device and the destination device;

wherein the route discovery request further includes an initial medium time, and wherein the route discovery response includes a second field indicating a residual medium time available at a device in the route that has a fewest residual number of slots available.

4. The method of claim 3, wherein the route discovery request includes a bandwidth priority flag indicating whether priority should be given to routes which have a greater number of available slots.

5. The method of claim 4, further comprising receiving at the source device a second route discovery response indicating a second route from the source device to the destination device, the second route discovery response indicating a greater residual medium time than the first route discovery response.

6. The method of claim 5, further comprising:
when the bandwidth priority flag is set indicating that priority should be given to routes which have a greater number of available slots, updating a route information table at the source device to set a hop count value to reach the destination device equal to a number of hops between the source device and the destination device that was received in the second route discovery response, and setting an ID for a next device to reach the destination device to match an ID for a device from which the source device received the second route discovery response.

7. In a wireless communication network comprising a plurality of devices, a method of discovering a route for transmitting data from a source device to a destination device via multi-hop relay, the method comprising:
receiving at an Nth device a route discovery request for transmitting data from the source device to the destination device, the route discovery request including at least: a first field indicating a hop-count limit, a second field indicating a number of slots, X, required for transmitting the data, a third field indicating a number of hops between the source device and the Nth device, a fourth field including a request ID uniquely identifying the route discovery request, a fifth field indicating an ID for the source device, and a sixth field indicating an ID for the destination device;
updating a route information table at the Nth device to set a hop count value to reach the source device from the Nth device to be equal to the number of hops between the source device and the Nth device that was received in the route discovery request, and to set an ID for a next device to reach the source device from the Nth device to match an ID for an (N−1)th device from which the Nth device received the route discovery request;
determining whether the Nth device has at least 2X slots available;
when the Nth device has at least 2X slots available, incrementing the number of hops in the fourth field of the route discovery request by one to update the route discovery request, and
broadcasting the updated route discovery request from the Nth device; and
when the Nth device does not have at least 2X slots available, discarding the route discovery request.

8. The method of claim 7, wherein the route discovery request also includes a seventh field indicating a residual medium time available at a device in a path from the source device to the Nth device that has a fewest residual number of slots available, and when the Nth device has at least 2X slots available, the method further includes determining whether a number of slots available at the Nth device, Y, is less than the residual medium time of the route discovery request, and when Y is less than the residual medium time, copying Y into the third field of the route discovery request to update the residual medium time.

9. The method of claim 8, wherein the route discovery request includes a bandwidth priority flag indicating whether priority should be given to routes which have a greater number of available slots.

10. The method of claim 7, further comprising:
receiving at the Nth device a new route discovery response for transmitting data from the source device to the destination device, the new route discovery response including at least: a first field indicating a number of hops between the destination device and the Nth device, a second field including the request ID uniquely identifying the route discovery request to which the new route discovery response pertains, a third field indicating an ID for the source device, and a fourth field indicating an ID for the destination device;
when at least one of: (1) the request ID of the new route discovery response is greater than a request ID for a previously received route discovery response; and (2) the number of hops between the destination device and the Nth device indicated in the new route discovery response is less than a hop count value for reaching the destination device that is currently stored in the route information table,
updating the route information table at the Nth device to set a hop count value to reach the destination device from the Nth device to be equal to the number of hops between the Nth device and the destination device that was received in the new route discovery response, and to set an ID for a next device to reach the destination device from the Nth device to match an ID for an (N+1)th device from which the Nth device received the new route discovery response,
incrementing the number of hops in the first field of the route discovery response by one to update the new route discovery request, and
forwarding the updated new route discovery response from the Nth device to the (N−1)th device which was previously stored in the route information table for reaching the source device.

11. The method of claim 10, further comprising when: (1) the request ID of the new route discovery response is not greater than a request ID for a previously received route discovery response, and (2) the number of hops between the destination device and the Nth device indicated in the route discovery response is not less than a hop count value for reaching the destination device that is currently stored in the route information table,
discarding the new route discovery response at the Nth device.

12. The method of claim 10, wherein the new route discovery response also includes a bandwidth priority flag indicating whether priority should be given to routes which have a greater number of available slots.

13. The method of claim 10, wherein the route discovery response also includes a fourth field indicating a residual medium time available at a device in the route that has a fewest residual number of slots available.

14. The method of claim 13, further comprising when: (1) the request ID of the new route discovery response is the same as a request ID for a previously received route discovery response, (2) the residual medium time of the new route discovery response is less than a residual medium time for the previous route discovery response having the same request ID as the new route discovery response, and (3) the bandwidth priority flag of the new route discovery response is set indicating that priority should be given to routes which have a greater number of available slots,
  updating the route information table at the Nth device to set a hop count value to reach the destination device from the Nth device to be equal to a number of hops between the Nth device and the destination device that was received in the new route discovery response, and to set an ID for a next device to reach the destination device from the Nth device to match an ID for an (N+1)th device from which the Nth device received the new route discovery response,
  incrementing the number of hops in the first field of the route discovery request by one to update the new route discovery request, and
  forwarding the updated new route discovery request from the Nth device to the (N−1)th device which was previously stored in the route information table for reaching the source device.

15. The method of claim 7, further comprising:
  receiving at the destination device at an Nth device a second route discovery request for transmitting data from the source device to the destination device, the second route discovery request including the fifth field including a request ID uniquely identifying the second route discovery request;
  comparing the request ID of the second route discovery request with the request ID of the first route discovery request, and
  when the request ID of the second route discovery request matches the request ID of the first route discovery request, discarding the second route discovery request.

16. In a wireless communication network comprising a plurality of devices, a method of discovering a route for transmitting data from a source device to a destination device via multi-hop relay, the method comprising:
  receiving at the destination device a route discovery request for transmitting data from the source device to the destination device, the route discovery request including at least: a first field indicating a hop-count limit, a second field indicating a number of slots, X, required for transmitting the data, a third field indicating a number of hops from the source device to the destination device, a fourth field including a request ID uniquely identifying the route discovery request, a fifth field indicating the source device, and a sixth field indicating the destination device;
  updating a route information table at the destination device to set a hop count value to reach the source device from the destination device to be equal to the number of hops from the source device to the destination device that was received in the route discovery request, and to set an ID for a next device to reach the source device from the destination device to match an ID for an Mth device from which the destination device received the route discovery request;
  determining whether the destination device has at least X slots available;
  when the destination device has at least X slots available,
    forwarding a route discovery response from the destination device to the Mth device from which the destination device received the route discovery request, the route discovery response including at least: a first field including the request ID uniquely identifying the route discovery request, a second field indicating the source device, a third field indicating the destination device, and a hop count field having an initialized hop count; and
  when the destination device does not have at least X slots available, discarding the route discovery request.

17. The method of claim 16, wherein the route discovery request also includes a bandwidth priority flag indicating whether priority should be given to routes which have a greater number of available slots.

18. The method of claim 17, wherein the route discovery request also includes a seventh field indicating a residual medium time available at a device in the route that has a fewest residual number of slots available, and wherein the route discovery response also includes a fourth field indicating a residual medium time available at a device in the route that has a fewest residual number of slots available,
  wherein the residual medium time of route discovery response is set equal to the residual medium time of the route discovery request.

19. The method of claim 18, further comprising:
  receiving a second route discovery request at the destination device;
  when the destination device has at least X slots available,
    when: (1) the request ID of the second route discovery request is the same as a request ID for the first route discovery request, (2) a residual medium time of second route discovery request is less than the residual medium time for the first route discovery request, and (3) the bandwidth priority flag of the second route discovery request is set indicating that priority should be given to routes which have a greater number of available slots,
      updating the route information table at the destination device to set a hop count value to reach the source device from the destination device to be equal to the number of hops from the source device to the destination device that was received in the second route discovery request, and to set an ID for a next device to reach the source device from the destination device to match an ID for a Pth device from which the destination device received the second route discovery request,
      forwarding a second route discovery response from the destination device to the Pth device from which the destination device received the route discovery request, the second route discovery response including at least: a first field indicating a residual medium time available at a device in the route that has a fewest residual number of slots available, a second field including the request ID uniquely identifying the route discovery request, a third field indicating the source device, a fourth field indicating the destination device, and a hop count field having an initialized hop count, wherein the residual medium time of second route discovery response is set equal to the residual medium time of the second route discovery request, and when the request ID of the second route discovery request is the same as a request ID for the first route discovery request, and at least one of (1) a residual medium time of second route discovery request is not less than the residual medium time for the first route discovery request, and (2) the bandwidth priority flag of the second route discovery request is reset indicating that priority should not be given to routes which have a greater number of available slots, discarding the second route discovery request, and when the destination device does not have at least X slots available, discarding the second route discovery request.

* * * * *